(12) United States Patent
Jeon

(10) Patent No.: US 10,155,519 B2
(45) Date of Patent: Dec. 18, 2018

(54) DEVICE FOR CONTROLLING SHIFT OF VEHICLE AND METHOD FOR CONTROLLING SHIFT USING THE SAME

(71) Applicants: Hyundai Motor Company, Seoul (KR); Kia Motors Corporation, Seoul (KR)

(72) Inventor: Byeong Wook Jeon, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 284 days.

(21) Appl. No.: 15/180,243

(22) Filed: Jun. 13, 2016

(65) Prior Publication Data

US 2017/0151951 A1    Jun. 1, 2017

(30) Foreign Application Priority Data

Nov. 30, 2015    (KR) .......................... 10-2015-0169039

(51) Int. Cl.
| | |
|---|---|
| *B60W 50/00* | (2006.01) |
| *B60W 30/18* | (2012.01) |
| *B60W 10/02* | (2006.01) |
| *B60W 10/11* | (2012.01) |

(Continued)

(52) U.S. Cl.
CPC ...... *B60W 30/18072* (2013.01); *B60W 10/02* (2013.01); *B60W 10/10* (2013.01); *B60W 10/11* (2013.01); *B60W 40/06* (2013.01); *B60W 50/0097* (2013.01); *B60W 50/0098* (2013.01); *B60W 2030/1809* (2013.01); *B60W 2030/18081* (2013.01); *B60W 2050/0095* (2013.01); *B60W 2520/10* (2013.01); *B60W 2540/10* (2013.01); *B60W 2540/12* (2013.01); *B60W 2550/142* (2013.01); *B60W 2710/021* (2013.01); *B60W 2710/1005* (2013.01); *Y02T 10/76* (2013.01)

(58) Field of Classification Search
None
See application file for complete search history.

(56) References Cited

U.S. PATENT DOCUMENTS

| | | | | |
|---|---|---|---|---|
| 2015/0151761 A1* | 6/2015 | Suzuki | ............ | B60W 30/18072 701/67 |
| 2015/0166065 A1* | 6/2015 | Kuroki | .................. | B60W 10/02 477/185 |

(Continued)

FOREIGN PATENT DOCUMENTS

| | | |
|---|---|---|
| JP | 10-184903 A | 7/1998 |
| JP | 3067584 B2 | 7/2000 |

(Continued)

*Primary Examiner* — Justin Holmes
(74) *Attorney, Agent, or Firm* — Mintz Levin Cohn Ferris Glovsky and Popeo, P.C.; Peter F. Corless

(57) ABSTRACT

A method for controlling a shift of a vehicle during a coasting driving is provided. The method includes performing a neutral control by releasing a clutch when an operation condition of the neutral control is satisfied during the coasting driving. Driving information regarding the vehicle is collected and a gradient of a forward road is detected using the driving information. A stop condition of the neutral control is determined using the gradient of the forward road, and a shift stage is determined when the neutral control is stopped.

19 Claims, 7 Drawing Sheets

(51) Int. Cl.
  *B60W 40/06*   (2012.01)
  *B60W 10/10*   (2012.01)

(56) References Cited

U.S. PATENT DOCUMENTS

| | | | | |
|---|---|---|---|---|
| 2015/0191168 A1* | 7/2015 | Mitsuyasu | ............ | B60W 20/00 |
| | | | | 701/54 |
| 2015/0315991 A1* | 11/2015 | Miura | .................. | B60W 10/02 |
| | | | | 701/48 |
| 2016/0052511 A1* | 2/2016 | Takeuchi | .................. | F02N 5/04 |
| | | | | 701/22 |

FOREIGN PATENT DOCUMENTS

| | | | |
|---|---|---|---|
| JP | 2015-051646 | A | 3/2015 |
| JP | 5846218 | B2 | 1/2016 |
| JP | WO2013-190653 | A1 | 2/2016 |
| KR | 10-0308970 | B1 | 9/2001 |
| KR | 10-1241783 | B1 | 3/2013 |

\* cited by examiner

DEVICE FOR CONTROLLING SHIFT OF VEHICLE AND METHOD FOR CONTROLLING SHIFT USING THE SAME

CROSS-REFERENCE TO RELATED APPLICATION

This application claims priority to and the benefit of Korean Patent Application No. 10-2015-0169039 filed in the Korean Intellectual Property Office on Nov. 30, 2015, the entire contents of which are incorporated herein by reference.

BACKGROUND (a) Field of the Invention

The present invention relates to a device and method for controlling a shift of a vehicle, and more particularly, to a device and method for controlling a shift of a vehicle based on a degree of a road gradient during coasting.

(b) Description of the Related Art

Generally, when the driver releases an accelerator pedal while driving a vehicle, the vehicle is coasting by the inertia. Typically, when a vehicle speed and an engine speed exceed certain values, the engine control apparatus cuts off the fuel injected into the engine to improve fuel efficiency. When the fuel is cut off when the vehicle is coasting, the engine acts as a load on the driving system, the vehicle speed is rapidly decreased.

However, when the driver wants to maintain a particular speed (hereinafter, constant speed) by coasting, there is an inconvenience of requiring the accelerator pedal to be re-engaged to maintain the constant speed, and the fuel efficiency deteriorates due to re-acceleration. Accordingly, the transmission is operated to the neutral state by a manual transmission driver during the coasting, and the vehicle is driven by vehicle inertia. Further, in the case of an automatic transmission, when the coasting condition is detected, the fuel is automatically cut off without disconnecting the power to the transmission, thus causing unintentional deceleration through driving resistance.

In order to solve such a problem, a neutral control method was developed so that when the coasting condition is detected, the transmission is automatically set to neutral and when the accelerator or brake pedal are again engaged, the transmission is reengaged. However, since the conventional neutral control method performs a neutral control based on accelerator and brake operation by the driver, there is a problem of frequent releasing and engaging of the forward driving stage clutch when the driver frequently operates the accelerator and brake pedals.

Thus, when releasing and engaging of the clutch is repeated, a rattling is generated when the clutch is engaged, and the drivability is deteriorated due to the acceleration delay. In addition, in the conventional neutral control method, when the forward driving stage is returned based on a gradient of the road, it does not distinguish the return stage based on the gradient. Therefore, shifting to lower stage by operation of the accelerator pedal may be difficult after returning from neutral stage to high stage.

The above information disclosed in this section is merely for enhancement of understanding of the background of the invention and therefore it may contain information that does not form the prior art that is already known in this country to a person of ordinary skill in the art.

SUMMARY

The present invention provides a device and method for controlling a shift of a vehicle having advantages of controlling a shift based on a degree of the gradient of the forward road during coasting.

An exemplary embodiment of the present invention provides a method for controlling a shift of a vehicle during a coasting driving that may include: performing a neutral control by releasing a clutch when an operation condition of the neutral control is satisfied during the coasting driving; collecting driving information regarding the vehicle, and detecting a gradient of a forward road using the driving information; and determining a stop condition of the neutral control using the gradient of the forward road, and determining a shift stage when the neutral control is stopped.

The detection of the gradient of the forward road may include collecting forward road information on which the vehicle is being driven, and recognizing the gradient of the forward road and a distance from the vehicle to a position of the gradient. The determination of the shift stage may include determining stop of the neutral control when the gradient of the forward road is greater than a predetermined value, or the distance from the vehicle to the position of the gradient is less than a predetermined value. The determination the shift stage may further include detecting a predetermined target shift stage based on a driving speed of the vehicle when the neutral control is stopped. The determination the shift stage may further include correcting the target shift stage based on a degree of the gradient of the forward road.

The method may further include stopping the neutral control and shifting to the corrected shift stage when the distance from the vehicle to the position of the gradient is less than the predetermined value. The operation condition of the neutral control may include conditions that the shift stage is in a drive (D) stage, a driving speed is greater a predetermined speed, an accelerator pedal and a brake is off (e.g., disengaged).

An exemplary embodiment of the present invention provides a device for controlling a shift of a vehicle that may include: a driving information detection unit configured to collect a driving information of the vehicle; a gradient recognizing unit configured to recognize at least one of a gradient of a forward road and a distance from the vehicle to a position of the gradient; and a controller configured to perform a neutral control when an operation condition of the neutral control is satisfied during the coasting driving, and determine a shift stage using the gradient of the forward road or the distance from the vehicle to the position of the gradient when the neutral control is stopped.

The controller may be configured to determine stop of the neutral control when the gradient of the forward road is greater than a predetermined value, or the distance from the vehicle to the position of the gradient is less than a predetermined value. The driving information of the vehicle may include at least one of forward road information on which the vehicle is being driven, vehicle position information, driving speed information, and shift stage information. The operation condition of the neutral control may include a condition that the shift stage is in a D stage, a driving speed is greater a predetermined speed, an accelerator pedal and a brake are off.

The controller may include a target shift stage detection unit configured to detect a target shift stage when using a driving speed when the neutral control is stopped. The controller may further include a shift stage compensation unit configured to correct the target shift stage based on a degree of the gradient of the forward road. The controller may be configured to execute stop the neutral control and shift to the corrected shift stage when the distance from the vehicle to the position of the gradient is less than the predetermined value.

According to the present invention for achieving the object, by recognizing the gradient of the forward road and the distance from the vehicle to the position of the gradient in the neutral control during coasting, correcting the target shift stage based on a degree of the gradient of the forward road, and controlling to shift to the corrected shift stage, it may be possible to prevent the kick down shift and improve vehicle-driving satisfaction and fuel consumption.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

DETAILED DESCRIPTION

Figure 1:
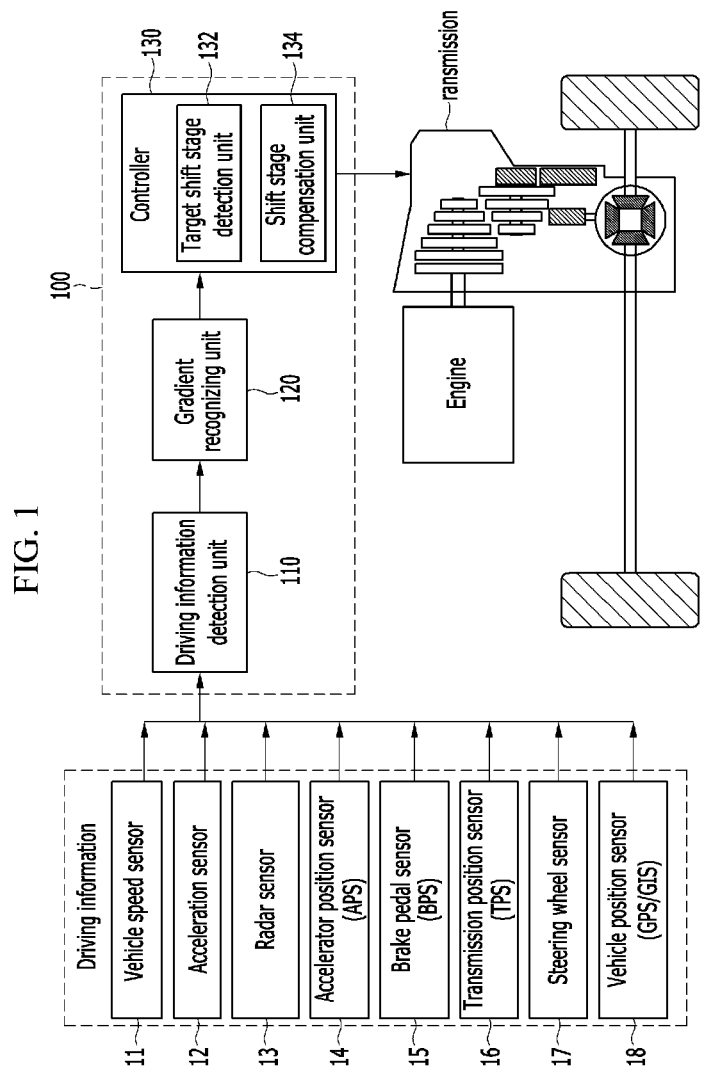
FIG. 1 is a schematic diagram of a device for controlling a shift of a vehicle according to an exemplary embodiment of the present invention.

In the following detailed description, only exemplary embodiments of the present invention have been shown and described, simply by way of illustration. As those skilled in the art would realize, the described exemplary embodiments may be modified in various different ways, all without departing from the spirit or scope of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuel derived from resources other than petroleum).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, some methods may be executed by at least one controller. The term controller/control unit refers to a hardware device including a memory and a processor configured to execute one or more steps interpreted as an algorithm structure. The memory stores algorithm steps, and the processor specifically executes the algorithm steps to perform one or more processes to be described below.

Further, control logic of the present invention may be implemented by a non-transient computer-readable medium on a computer-readable means including executable program instructions executed by a processor, a controller, or the like. Examples of a computer-readable medium, although not restrictive, include ROMs, RAMs, CD-ROMs, magnetic tapes, floppy disks, flash drives, smart cards, and optical data storages. The computer-readable recording medium may be distributed in a network-connected computer system, and for example, may be stored and executed in a distributed manner by a telematics server or Controller Area Network (CAN).

A device and method for controlling a shift of a vehicle will now be described with reference to FIG. 1 to FIG. 7. FIG. 1 is a schematic diagram of a device for controlling a shift of a vehicle according to an exemplary embodiment of the present invention. In particular, for convenience of explanation, a configuration of the device for controlling a shift of a vehicle according to the exemplary embodiment of the present invention is schematically illustrated, but the device for controlling a shift is not limited thereto.

Referring to FIG. 1, the device for controlling a shift 100 according to an exemplary embodiment of the present invention may include a driving information detection unit 110, a gradient recognizing unit 120, and a controller 130. The controller 130 may be configured to operate the driving information detection unit 110 (e.g., a sensor) and the gradient recognizing unit 120 (e.g., a sensor). The driving information detection unit 110 may be configured to collect driving information of a vehicle. The driving information may include forward road information on which the vehicle is being driven, information regarding current location of the vehicle, a driving speed, shift stage information, and the like.

Additionally, the driving information detection unit 110 may be configured to detect the driving information of the vehicle using at least one of a vehicle speed sensor 11, an acceleration sensor 12, a radar sensor 13, an accelerator position sensor (APS) 14, a brake pedal sensor (BPS) 15, a transmission position sensor (TPS) 16, a steering wheel sensor 17, and a vehicle position sensor (GPS/GIS) 18. The driving information detection unit 110 may be configured to collect a vehicle speed using the vehicle speed sensor 11, collect an acceleration of the vehicle using the acceleration sensor 12, and detect a distance inter-vehicle distances with a forward vehicle (e.g., a vehicle traveling ahead of the subject vehicle) using the radar sensor 13.

The driving information detection unit 110 may further be configured to detect operation states of an accelerator using the APS 14 and detect operation states of a brake using the BPS 15. Further, the driving information detection unit 110 may be configured to detect a position of gear shifting (shift stage) using the TPS 16 and detect a steering state of the vehicle using the steering wheel sensor 17. The driving information detection unit 110 may additionally be configured to detect vehicle position information regarding a road type, a degree of curve, and gradient information based on a global positioning system (GPS/GIS) using the vehicle position sensor 18.

The gradient recognizing unit 120 may be configured to recognize a gradient of a forward road or a distance from the vehicle to a position of the gradient using the driving information. The gradient recognizing unit 120 may further be configured to recognize the gradient of the forward road on which the vehicle arrives after a few seconds, using navigation map information in a neutral control state during coasting. The controller 130 may be configured to release a clutch and perform the neutral control when an operation condition of the neutral control is satisfied during coasting. The controller 130 may further be configured to determine a shift stage the distance from the vehicle to the position of the gradient when the neutral control is stopped. In particular, the operation condition of the neutral control may include conditions that the shift stage is in a D stage, a driving speed is greater a predetermined speed, and an accelerator pedal and a brake are disengaged.

The controller 130 may be configured to detect a target shift stage using the driving speed of the vehicle when the neutral control is stopped, and correct the target shift stage based on a degree of the gradient of the forward road. The controller 130 may be configured to stop or terminate the neutral control and shift the vehicle transmission to the corrected shift stage when the distance from the vehicle to the position of the gradient is less than the predetermined value. In addition, the controller 130 may include a target shift stage detection unit 132 and a shift stage compensation unit 134 according to an exemplary embodiment of the present invention.

The target shift stage detection unit 132 may be configured to detect the target shift stage using the driving speed of the vehicle when the neutral control is stopped. The shift stage compensation unit 134 may be configured to correct the target shift stage based on a degree of the gradient of the forward road. Accordingly, the controller 130 may be implemented with at least one processor operating by a predetermined program, and the predetermined program may be programmed to perform each step according to the method for controlling a shift of a vehicle according to an exemplary embodiment of the present invention.

Figure 2:
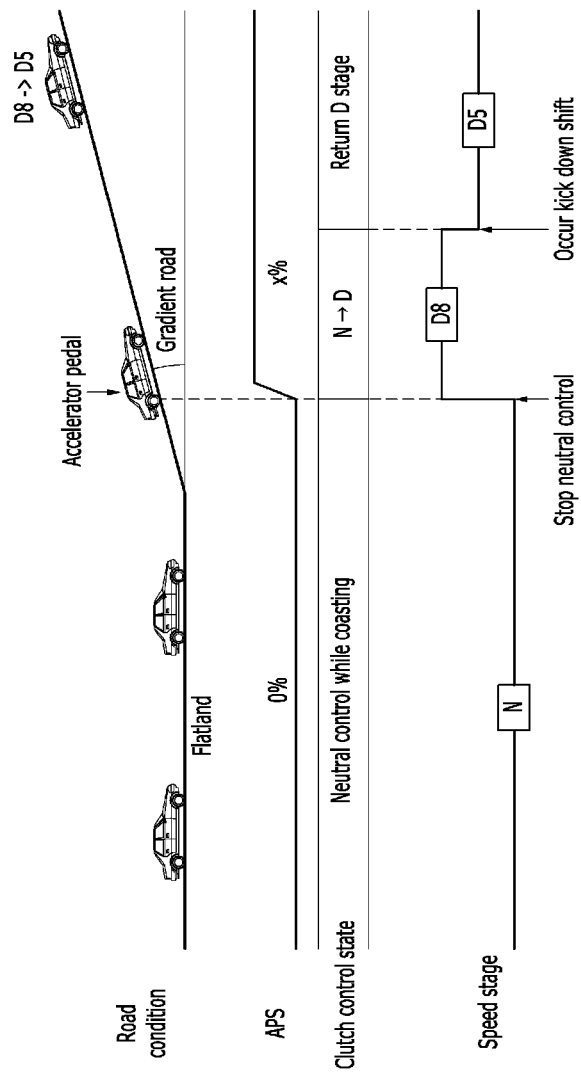
FIG. 2 is a view showing shifting processes on a gradient road according to a related art.
Figure 3:
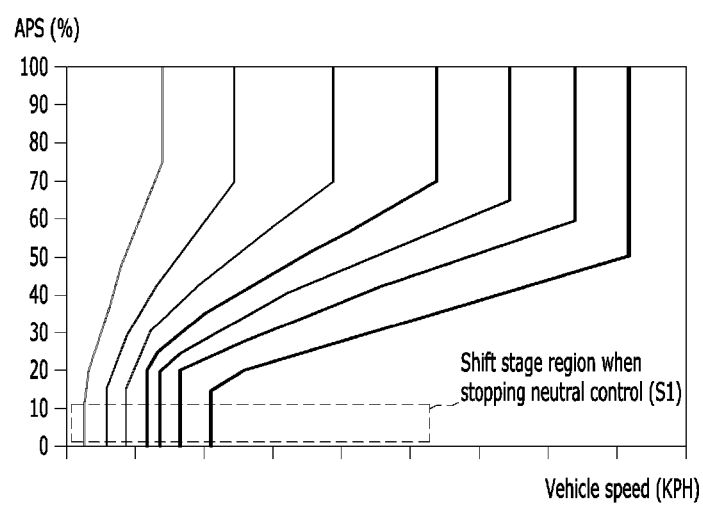
FIG. 3 is a view showing a shift stage area when stopping a neutral control in FIG. 2 according to the related art.

FIG. 2 is a drawing showing shifting processes on a gradient road according to a conventional art, and FIG. 3 is a drawing showing a shift stage area when stopping a neutral control in FIG. 2. Referring FIGS. 2 and 3, in the conventional art, the neutral control is stopped just after the accelerator pedal is pressed or engaged, and the target shift stage is determined under the condition when APS opening degree is a lowest condition (0%). In other words, in conventional art, the shift stage is returned to a highest shift stage to shift from the current vehicle speed. Accordingly, the target shift stage is determined at a region S1 which the APS is low when the neutral control is stopped. Thus, in the conventional art, after shifting from N to D, a kick down shift occurs based on APS opening (x %), and an acceleration response is delayed.

Figure 4:
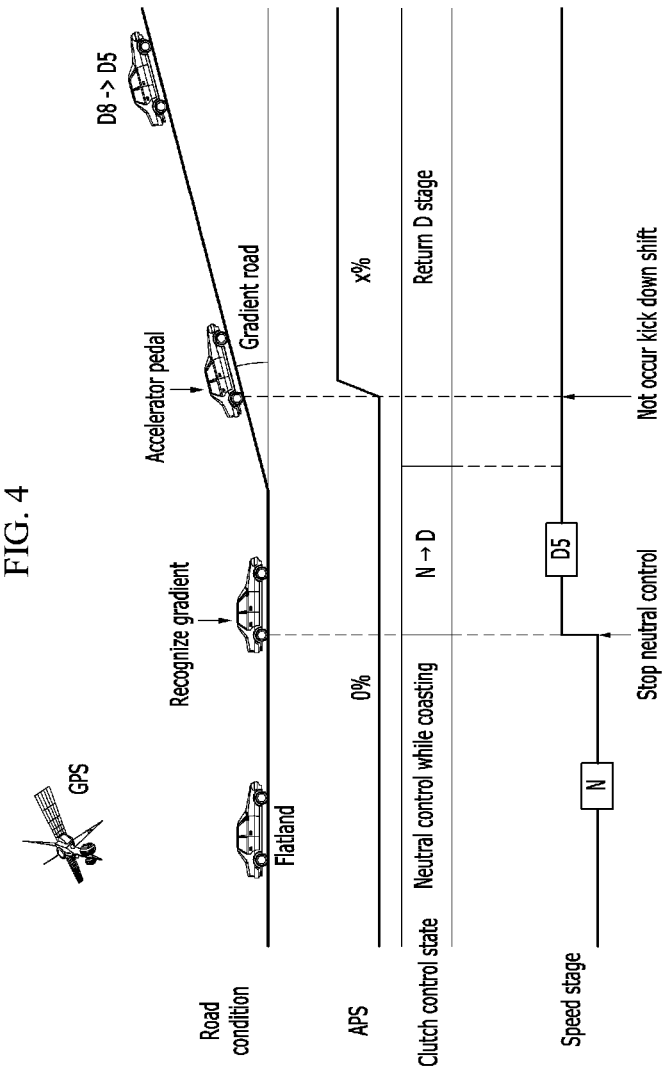
FIG. 4 is a drawing showing shifting processes on a gradient road during an operation of a neutral control according to an exemplary embodiment of the present invention.
Figure 5:
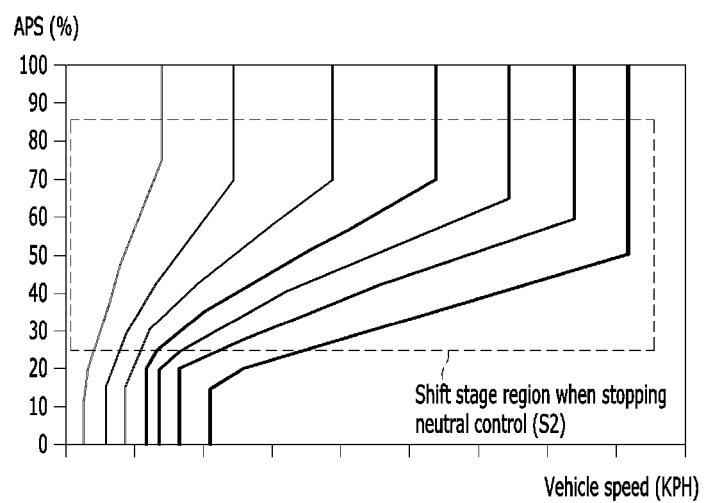
FIG. 5 is a drawing showing a shift stage area when stopping a neutral control in FIG. 4 according to an exemplary embodiment of the present invention.

FIG. 4 is a drawing showing shifting processes on a gradient road during an operation of a neutral control according to an exemplary embodiment of the present invention, and FIG. 5 is a drawing showing a shift stage area when stopping a neutral control in FIG. 4. Referring to FIGS. 4 and 5, the device 100 for controlling a shift according to an exemplary embodiment of the present invention may be configured to detect the gradient of the forward road on which the vehicle arrives after a few seconds in the neutral control state, and determine a stop condition of the neutral control based on the gradient of the forward road.

When the distance to the position of the gradient is less than the threshold value (e.g., about 50 m), the device 100 for controlling a shift according to an exemplary embodiment of the present invention may be configured to stop the neutral control and shift to the final shift stage determined based on the gradient of the forward road. As shown in FIG. 5, the shift stage when the neutral control is stopped may be determined based on the gradient of the forward road at a region S2 where the APS is high.

For example, when the neutral control is stopped, the device 100 may be configured to lower the target shift stage based on the gradient target shift stage in advance. The device 100 may be configured to set the shift sage by D6 when the neutral control is stopped, maintain the D6 during acceleration and obtain driving torque for climbing (e.g., driving on an inclined road surface). Therefore, it may be possible to prevent the kick down shift that is not required.

Figure 6:
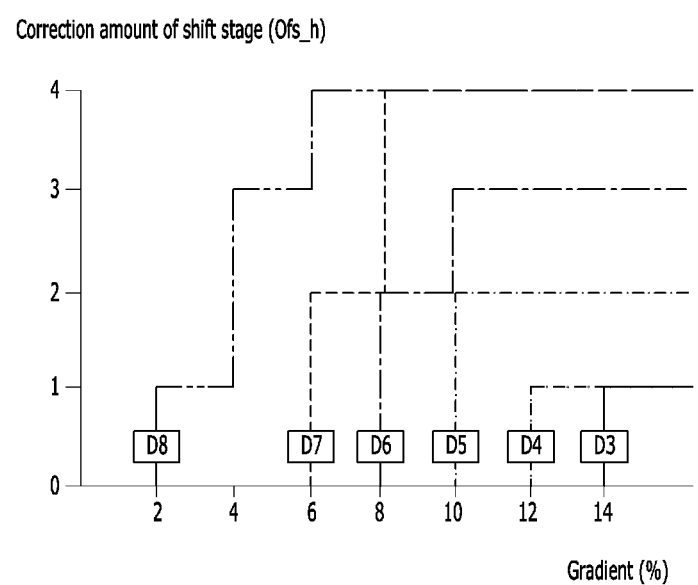
FIG. 6 is a drawing showing a correction amount of a shift stage according to a target shift stage and a gradient according to an exemplary embodiment of the present invention.

FIG. 6 is a drawing showing a correction amount of a shift stage according to a target shift stage and a gradient according to an exemplary embodiment of the present invention. Referring to FIG. 6, the device 100 for controlling a shift according to an exemplary embodiment of the present invention may be configured to determine the target shift stage base on the vehicle speed, and determine the final shift stage by reducing a correction amount of a shift stage from the target shift stage.

Particularly, the device 100 may be configured to shift the vehicle transmission to the forward driving stage by correcting the shift stage based on the gradient of the forward road stepwise. Therefore, it may be possible to prevent unnecessary kick down shifts and acceleration response delay. For example, when the target shift stage is D8, the shift stage may be shifted to the D7 when the gradient of the forward road is 4%, the shift stage may be shifted to the D6 when the gradient of the forward road is 6%, the shift stage may be shifted to the D5 when the gradient of the forward road is 8%, and the shift stage may be shifted to the D4 when the gradient of the forward road is 10%.

Figure 7:
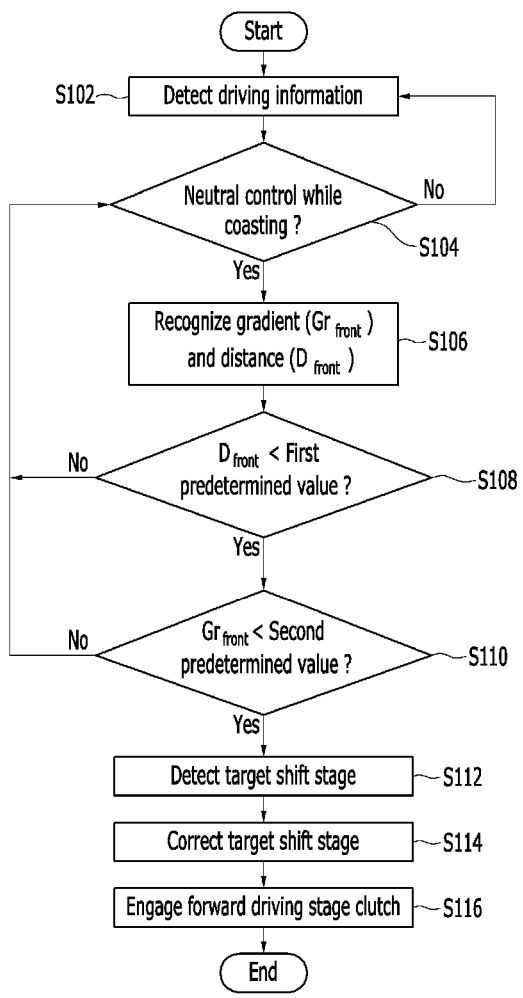
FIG. 7 is a flowchart briefly showing a process for controlling a shift of a vehicle according to a gradient of a forward road according to an exemplary embodiment of the present invention.

FIG. 7 is a flowchart briefly showing a process for controlling a shift of a vehicle according to a gradient of a forward road according to an exemplary embodiment of the present invention. The flowchart will be described with the same reference numerals as that of the configuration of FIG. 1. Referring to FIG. 7, the device 100 may be configured to detect the driving information while the vehicle is being driven at step S102. In particular, the driving information may include forward road information on which the vehicle is being driven, vehicle position information, driving speed information, and shift stage information.

Further, the device 100 may be configured to release the clutch when the operation condition of the neutral control is satisfied during the coasting driving at step S104. The device 100 may then be configured to recognize the gradient $Gr_{front}$ of the forward road and the distance $D_{front}$ to the position of the gradient using the driving information at step S106.

Additionally, the device 100 may be configured to compare the distance $D_{front}$ with a first predetermined value, and compare the gradient $Gr_{front}$ with a second predetermined gradient predetermined value at steps S108 and S110. Particularly, the device 100 may be configured to determine to stop of the neutral control when the distance $D_{front}$ is less than the first predetermined value and the gradient $Gr_{front}$ is greater than a second predetermined value. The device 100 for controlling a shift may be configured to detect the target shift stage based on the vehicle speed, and correct the target shift stage based on a degree of the gradient of the forward road at steps S112 and S114. The device 100 may be configured to shift as the D stage by engaging the forward driving stage clutch to the corrected shift stage at step S116.

As described, the device and method for controlling a shift according to an exemplary embodiment of the present invention may be configured to recognize the gradient of the forward road and the distance from the vehicle to the position of the gradient in the neutral control during coasting, correct the target shift stage based on a degree of the gradient of the forward road, and control to shift to the corrected shift stage. Therefore, it may be possible to prevent the kick down shift and improve vehicle-driving satisfaction and fuel consumption.

The foregoing exemplary embodiments of the present invention are not implemented only by an apparatus and a method, and therefore may be realized by programs realizing functions corresponding to the configuration of the exemplary embodiment of the present invention or recording media on which the programs are recorded. Such recording media may be executed in a user terminal as well as a server.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling a shift of a vehicle during a coasting driving, comprising:
   performing, by a controller, a neutral control by releasing a clutch when an operation condition of the neutral control is satisfied during the coasting driving;
   collecting, by the controller, driving information regarding the vehicle, and detecting a gradient of a forward road using the driving information; and
   determining, by the controller, a stop condition of the neutral control using the gradient of the forward road, and determining a shift stage when the neutral control is stopped.

2. The method of claim 1, wherein the detection of the gradient of the forward road includes collecting, by the controller, forward road information on which the vehicle is being driven, and recognizing the gradient of the forward road and a distance from the vehicle to a position of the gradient.

3. The method of claim 2, wherein the determination of the shift stage includes determining, by the controller, stop of the neutral control when the gradient of the forward road is greater than a predetermined value, or the distance from the vehicle to the position of the gradient is less than a predetermined value.

4. The method of claim 3, wherein the determination of the shift stage further includes detecting, by the controller, a predetermined target shift stage based on a driving speed of the vehicle when the neutral control is stopped.

5. The method of claim 4, wherein the determination of the shift stage further includes correcting, by the controller, the target shift stage based on a degree of the gradient of the forward road.

6. The method of claim 5, further comprising:
   stopping, by the controller, the neutral control and shifting to the corrected shift stage when the distance from the vehicle to the position of the gradient is less than the predetermined value.

7. The method of claim 1, wherein the operation condition of the neutral control includes conditions that the shift stage is in a drive (D) stage, a driving speed is greater a predetermined speed, and an accelerator pedal and a brake are disengaged.

8. A device for controlling a shift of a vehicle, comprising:
   a driving information detection unit configured to collect driving information of the vehicle;
   a gradient recognizing unit configured to recognize at least one of a gradient of a forward road and a distance from the vehicle to a position of the gradient; and
   a controller configured to perform a neutral control when an operation condition of the neutral control is satisfied during the coasting driving, and determine a shift stage using the gradient of the forward road or the distance from the vehicle to the position of the gradient when the neutral control is stopped.

9. The device of claim 8, wherein the controller is configured to determine stop of the neutral control when the gradient of the forward road is greater than a predetermined value, or the distance from the vehicle to the position of the gradient is less than a predetermined value.

10. The device of claim 8, wherein the driving information of the vehicle includes at least one of forward road information on which the vehicle is being driven, vehicle position information, driving speed information, and shift stage information.

11. The device of claim 8, wherein the operation condition of the neutral control includes a condition that the shift stage is in a drive (D) stage, a driving speed is greater a predetermined speed, and an accelerator pedal and a brake are disengaged.

12. The device of claim 8, wherein the controller includes a target shift stage detection unit configured to detect a target shift stage when using a driving speed when the neutral control is stopped.

13. The device of claim 12, wherein the controller further includes a shift stage compensation unit configured to correct the target shift stage based on a degree of the gradient of the forward road.

14. The device of claim 13, wherein the controller is configured to stop the neutral control and shift to the corrected shift stage when the distance from the vehicle to the position of the gradient is less than the predetermined value.

15. A non-transitory computer readable medium containing program instructions executed by a controller for executing a shift of a vehicle during a coasting driving, the computer readable medium comprising:
   program instructions that perform a neutral control by releasing a clutch when an operation condition of the neutral control is satisfied during the coasting driving;

program instructions that collect driving information regarding the vehicle, and detect a gradient of a forward road using the driving information; and program instructions that determine a stop condition of the neutral control using the gradient of the forward road, and determine a shift stage when the neutral control is stopped.

16. The non-transitory computer readable medium of claim 15, wherein the detection of the gradient of the forward road program instructions that collect forward road information on which the vehicle is being driven, and recognize the gradient of the forward road and a distance from the vehicle to a position of the gradient.

17. The non-transitory computer readable medium of claim 16, wherein the determination of the shift stage includes program instructions that determine stop of the neutral control when the gradient of the forward road is greater than a predetermined value, or the distance from the vehicle to the position of the gradient is less than a predetermined value.

18. The non-transitory computer readable medium of claim 17, wherein the determination of the shift stage further includes program instructions that detect a predetermined target shift stage based on a driving speed of the vehicle when the neutral control is stopped.

19. The non-transitory computer readable medium of claim 18, wherein the determination of the shift stage further includes program instructions that correct the target shift stage based on a degree of the gradient of the forward road.

\* \* \* \* \*